United States Patent
Sato

(10) Patent No.: US 11,093,234 B2
(45) Date of Patent: Aug. 17, 2021

(54) AUTOMATIC UPDATING SYSTEM, AND UPDATING METHOD AND PROGRAM THEREFOR

(71) Applicant: TOYOTA JIDOSHA KABUSHIKI KAISHA, Toyota (JP)

(72) Inventor: Shun Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/796,110

(22) Filed: Feb. 20, 2020

(65) Prior Publication Data
US 2020/0293302 A1  Sep. 17, 2020

(30) Foreign Application Priority Data
Mar. 13, 2019  (JP) .............................. JP2019-046205

(51) Int. Cl.
*G06F 8/65* (2018.01)
*G06F 9/48* (2006.01)

(52) U.S. Cl.
CPC .............. *G06F 8/65* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2009/0007255 A1* | 1/2009 | Grzonka | ................. | H04L 67/34 726/15 |
| 2013/0179877 A1* | 7/2013 | Dain | .................. | G06F 11/3423 717/178 |
| 2015/0066813 A1* | 3/2015 | Andreatta | ............... | G06F 9/505 706/11 |
| 2015/0310674 A1* | 10/2015 | Humphrey | ............ | H04W 4/029 701/24 |
| 2017/0076235 A1* | 3/2017 | Noto | ...................... | G06F 9/4843 |
| 2018/0095745 A1* | 4/2018 | Mine | ....................... | G06F 8/658 |

FOREIGN PATENT DOCUMENTS

| | | |
|---|---|---|
| JP | 08-263125 A | 10/1996 |
| JP | 2006-007342 A | 1/2006 |

* cited by examiner

*Primary Examiner* — Lewis A Bullock, Jr.
*Assistant Examiner* — Mark A Gooray
(74) *Attorney, Agent, or Firm* — Sughrue Mion, PLLC

(57) ABSTRACT

An automatic updating system includes an off-line management server, an in-line management server, a production management server configured to calculate a non-operating time in each time period, and a data analysis server. The off-line management server installs update-software transmitted from a manufacturer server in a corresponding off-line robot based on the transmitted update-software, evaluates the installed update-software, and determines whether or not it is possible to update the in-line robot by the update-software based on the evaluation. The data analysis server schedules the timing of the update of the software so that the update by the update-software, which has been determined to be updatable, is carried out within the non-operating time of the in-line robot. The in-line management server updates the software of the in-line robot at the timing scheduled by the data analysis server.

5 Claims, 8 Drawing Sheets

| DATE | A | B | C | D | E | [MIN.] |
|---|---|---|---|---|---|---|
| 2018/12/7 | 240 | 60 | 40 | 60 | | |
| 2018/12/8 | 180 | 60 | 20 | 60 | | |
| ⋮ | ⋮ | ⋮ | ⋮ | ⋮ | | |

Fig. 3

IDLE-TIME LIST

| DATE | A | B | C | D | E | [MIN.] |
|---|---|---|---|---|---|---|
| 2018/12/7 | 240 | 60 | 40 | 60 | | ... |
| 2018/12/8 | 180 | 60 | 20 | 60 | | ... |

MAINTENANCE-TIME LIST

| DATE | A | B | C | D | E | [MIN.] |
|---|---|---|---|---|---|---|
| 2018/12/7 | 120 | 10 | 0 | 30 | | ... |
| 2018/12/8 | 30 | 30 | 20 | 30 | | ... |

240 − 120 = 120

NET-IDLE-TIME LIST

| DATE | A | B | C | D | E | [MIN.] |
|---|---|---|---|---|---|---|
| 2018/12/7 | 120 | 50 | 40 | 30 | | ... |
| 2018/12/8 | 30 | 30 | 20 | 30 | | ... |

Fig. 7

AUTOMATIC UPDATING SYSTEM, AND UPDATING METHOD AND PROGRAM THEREFOR

CROSS REFERENCE TO RELATED APPLICATIONS

This application is based upon and claims the benefit of priority from Japanese patent application No. 2019-046205, filed on Mar. 13, 2019, the disclosure of which is incorporated herein in its entirety by reference.

BACKGROUND

The present disclosure relates to an automatic updating system for automatically updating software of a robot, and an updating method and a program therefor.

There is a problem that when software of a plurality of robots installed in a factory or the like is individually updated for each robot, the number of steps required for the updating becomes very large.

To cope with such a problem, an automatic updating system has been known, in which software to be updated is managed in a host computer and software of each robot is updated by collectively transmitting update-software to each robot (see, for example, Japanese Unexamined Patent Application Publication No. H08-263125).

However, in the above-described automatic updating system, there is a possibility that when there is a defect in the update-software, all the robots may malfunction.

Further, another automatic updating system has been known, in which a robot is first moved to a pre-registered update performing place and then software of that robot is updated (see, for example, Japanese Unexamined Patent Application Publication No. 2006-7342). However, the above-described automatic updating system involves the trouble of having to move the robot, and hence the number of steps is not reduced.

SUMMARY

The present disclosure has been made in order to solve the above-described problem, and one of main objects thereof is to provide an automatic updating system capable of reducing the number of steps for updating software of robots and preventing defects in update-software, and an updating method and a program therefor.

A first exemplary aspect is an automatic updating system configured to automatically update software of an in-line robot disposed at a production line in a factory, including:

an off-line management server configured to manage an off-line robot, the off-line robot being a robot that is not used in the production line;

an in-line management server configured to manage the in-line robot;

a production management server configured to calculate a non-operating time of the in-line robot in each time period based on a production plan of the factory; and a data analysis server configured to schedule a timing of an update of the software of the in-line robot, in which the off-line management server installs update-software transmitted from a manufacturer server in a corresponding off-line robot based on the transmitted update-software, evaluates the installed update-software, and determines whether or not it is possible to update the in-line robot by the update-software based on the evaluation, the data analysis server schedules the timing of the update of the software of the in-line robot so that the update by the update-software, which has been determined to be updatable by the off-line management server, is carried out within the non-operating time of the in-line robot calculated by the production management server, and the in-line management server updates the software of the in-line robot at the timing scheduled by the data analysis server.

In an aspect, the production management server may create an idle-time list indicating a length of the non-operating time of the in-line robot in each time period based on the production plan of the factory and create a maintenance-time list indicating a length of a maintenance time of the in-line robot in each time period based on a maintenance plan of the factory.

The data analysis server may create a net-idle-time list indicating a length of a net idle time in each non-operating time period by subtracting the maintenance time in each non-operating time period in the maintenance-time list from the idle time in that non-operating time period in the idle-time list, and schedule the timing of the update of the software of the in-line robot so that the update by the update-software is carried out within the net idle time in the net-idle-time list.

In an aspect, when the in-line management server determines that a memory capacity of an in-line robot to be updated is smaller than a memory capacity required for the update-software based on update-software information transmitted from the manufacturer server, the in-line management server may perform data reduction in that in-line robot so that the memory capacity of that in-line robot becomes larger than the required memory capacity.

Another exemplary aspect may be an updating method by an automatic updating system, the automatic updating system including:

an off-line management server configured to manage an off-line robot, the off-line robot being a robot that is not used in a production line in a factory;

an in-line management server configured to manage an in-line robot disposed at the production line in the factory;

a production management server configured to calculate a non-operating time of the in-line robot in each time period based on a production plan of the factory; and a data analysis server configured to schedule a timing of an update of the software of the in-line robot, the updating method including:

installing, by the off-line management server, update-software transmitted from a manufacturer server in a corresponding off-line robot based on the transmitted update-software, evaluating the installed update-software, and determining whether or not it is possible to update the in-line robot by the update-software based on the evaluation;

scheduling, by the data analysis server, the timing of the update of the software of the in-line robot so that the update by the update-software, which has been determined to be updatable by the off-line management server, is carried out within the non-operating time of the in-line robot calculated by the production management server; and updating, by the in-line management server, the software of the in-line robot at the timing scheduled by the data analysis server.

Another exemplary aspect may be a program for an automatic updating system, the automatic updating system including:

an off-line management server configured to manage an off-line robot, the off-line robot being a robot that is not used in a production line in a factory;

an in-line management server configured to manage an in-line robot disposed at the production line in the factory;

a production management server configured to calculate a non-operating time of the in-line robot in each time period based on a production plan of the factory; and a data analysis server configured to schedule a timing of an update of the software of the in-line robot, the program being adapted to cause a computer to execute:

a process for installing, by the off-line management server, update-software transmitted from a manufacturer server in a corresponding off-line robot based on the transmitted update-software, evaluating the installed update-software, and determining whether or not it is possible to update the in-line robot by the update-software based on the evaluation;

a process for scheduling, by the data analysis server, the timing of the update of the software of the in-line robot so that the update by the update-software, which has been determined to be updatable by the off-line management server, is carried out within the non-operating time of the in-line robot calculated by the production management server; and a process for updating, by the in-line management server, the software of the in-line robot at the timing scheduled by the data analysis server.

According to the present disclosure, it is possible to provide an automatic updating system capable of reducing the number of steps for updating software of robots and preventing defects in update-software, and an updating method and a program therefor.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 3 shows an example of an idle-time list of an in-line robot;

FIG. 7 shows an example of a net-idle-time list of an in-line robot; and

DESCRIPTION OF EMBODIMENTS

Embodiments of the present disclosure will be described hereinafter with reference to the drawings. An automatic updating system according to an embodiment of the present disclosure is, for example, one that centrally manages software of a plurality of robots disposed in a factory, and automatically and collectively updates the software. In this way, instead of updating software of each robot one by one, the software of the robots can be automatically and collectively updated. Therefore, the number of steps for updating the software can be significantly reduced.

Figure 1:
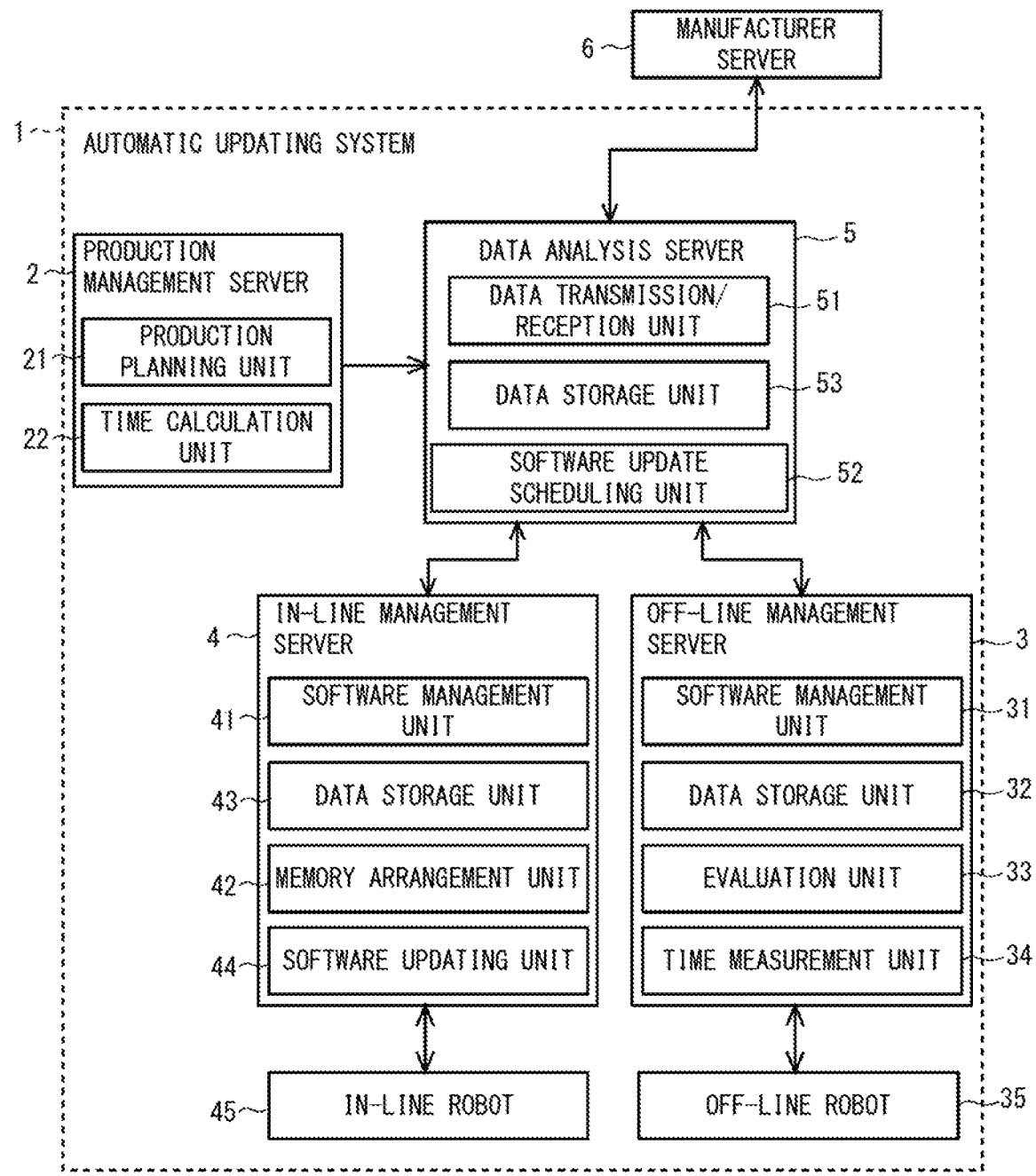
FIG. 1 is a block diagram showing a schematic system configuration of an automatic updating system according to an embodiment of the present disclosure.

FIG. 1 is a block diagram showing a schematic system configuration of an automatic updating system according to an embodiment of the present disclosure. The automatic updating system 1 according to this embodiment includes a production management server 2, an off-line management server 3, an in-line management server 4, and a data analysis server 5.

The production management server 2, the off-line management server 3, the in-line management server 4, and the data analysis server 5 may be connected to each other through a communication network such as the Internet.

Each of the production management server 2, the off-line management server 3, the in-line management server 4, and the data analysis server 5 is formed by, for example, hardware mainly using a microcomputer including: a CPU (Central Processing Unit) that performs arithmetic processing and the like; a memory including a ROM (Read Only Memory) and a RAM (Random Access Memory) in which arithmetic programs and the like executed by the CPU are stored; an interface unit (I/F) that externally receives and outputs signals, and so on. The CPU, the memory, and the interface unit are connected to each other through a data bus or the like.

It should be noted that when software of a plurality of robots installed in a factory or the like is individually updated for each robot, the number of steps required for the updating becomes very large. Further, there is a possibility that when there is a defect in software to be updated (hereinafter referred to as update-software), all the in-line robots may malfunction.

To cope with such a problem, in the automatic updating system 1 according to this embodiment, the off-line management server 3 installs update-software transmitted from a manufacturer server 6 in a corresponding off-line robot 35 based on the transmitted update-software, evaluates the installed update-software, and determines whether or not it is possible to update the in-line robot by the update-software based on the evaluation. The data analysis server 5 schedules a timing of the update of software of an in-line robot 45 so that the update by the update-software, which has been determined to be updatable by the off-line management server 3, is carried out within a non-operating time of the in-line robot 45 calculated by the production management server 2. The in-line management server 4 updates the software of the in-line robot 45 at the timing scheduled by the data analysis server 5.

As described above, the data analysis server 5 schedules the timing of the update of the software of the in-line robot 45. Then, the in-line management server 4 updates the software of the in-line robot 45 at the timing scheduled by the data analysis server 5. In this way, software of a plurality of in-line robots 45 can be centrally managed, and automatically and collectively updated, so that the number of steps for updating the software can be reduced. Further, the off-line management server 3 installs the update-software in the corresponding off-line robot 35, evaluates the installed update-software, and determines whether or not it is possible to update the in-line robot based on the evaluation. As a result, it is possible to prevent defects in the update-software. That is, it is possible to reduce the number of steps for updating the software of the in-line robots 45 and prevent defects in the update-software.

Firstly, the production management server 2 is described in detail.

The production management server 2 performs production management of vehicles and the like. The production management server 2 includes a production planning unit 21 that acquires information about a production plan, an overtime plan, and a maintenance plan, and a time calculation unit 22 that creates an idle-time list of each in-line robot 45. The in-line robots 45 are, for example, robots installed in a production line in a factory and take part in the production of vehicles or the like.

Figure 2:
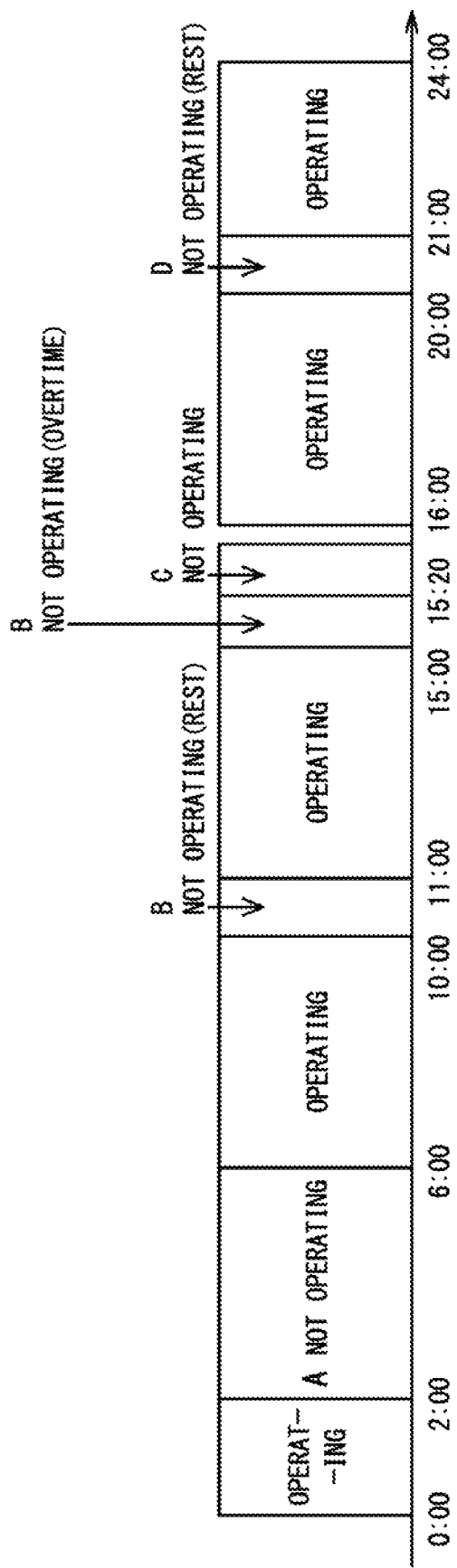
FIG. 2 shows an example of an operating time and a non-operating time of an in-line robot.

The production planning unit 21 acquires, for example, information about a production plan, an overtime plan, and a maintenance plan of the factory. The production planning unit 21 may automatically make the production plan, the overtime plan, and the maintenance plan of the factory based on information input by a user through an input device such as a PC (Personal Computer). As shown in FIG. 2, the production planning unit 21 schedules an operating time and a non-operating time of each in-line robot 45 based on the production plan, the overtime plan, and the maintenance plan.

As shown in FIG. 3, the time calculation unit 22 creates, for example, an idle-time list of each in-line robot 45 based on the production plan, the overtime plan, and the maintenance plan acquired by the production planning unit 21. The idle-time list is information indicating, for each day, lengths of non-operating time periods (A to D) during which its corresponding in-line robot 45 does not operate.

The time calculation unit 22 creates a maintenance-time list for each in-line robot 45 based on the production plan, the overtime plan, and the maintenance plan acquired by the production planning unit 21. The maintenance-time list is information indicating a length of a maintenance time during which its corresponding in-line robot 45 is inspected in each of the non-operating time periods (A to D). Note that the in-line management server 4 may create a maintenance-time list for each in-line robot 45 based on the production plan, the overtime plan, and the maintenance plan.

The time calculation unit 22 of the production management server 2 transmits the created idle-time list, the created maintenance-time list, and the information about the production plan of each in-line robots 45 to a software update scheduling unit 52 of the data analysis server 5.

Figure 4:
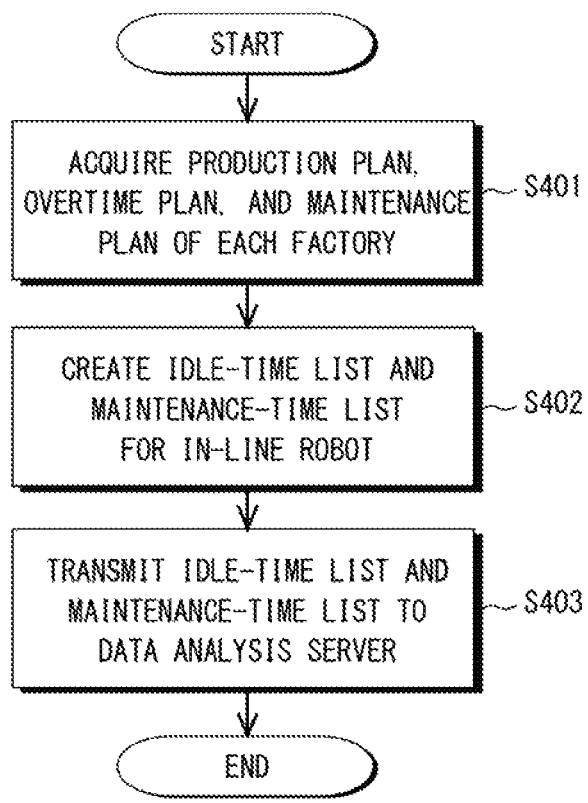
FIG. 4 is a flowchart showing a process flow of a production management server.

FIG. 4 is a flowchart showing a process flow of the production management server.

The production planning unit 21 of the production management server 2 acquires a production plan, an overtime plan, and a maintenance plan of each factory (step S401).

The time calculation unit 22 creates an idle-time list and a maintenance-time list for each in-line robot 45 based on the production plan, the overtime plan, and the maintenance plan acquired by the production planning unit 21 (step S402).

The time calculation unit 22 transmits the created idle-time list, the maintenance-time list, and the information about the production plan of each in-line robots 45 to the software update scheduling unit 52 of the data analysis server 5 (step S403).

Next, the off-line management server 3 is described in detail.

A plurality of off-line robots 35 are connected to the off-line management server 3 through a network or the like. The off-line management server 3 manages the off-line robots 35. The off-line robots 35 are, for example, non-mass production robots that are not used in the production line of vehicles or the like and hence do not take part in the production of vehicles or the like, robots used for education, robots for experiments/verifications, or the like.

The off-line management server 3 includes a software management unit 31 that manages software of the off-line robots 35, a data storage unit 32 that stores backup data for each of the off-line robots 35, an evaluation unit 33 that evaluates the software of the off-line robots 35, and a time measurement unit 34 that measures a time required for updating the software of the off-line robot 35.

The software management unit 31 instructs, based on information of an in-line robot 45 to be updated transmitted from the data analysis server 5, an corresponding off-line robot 35 to output backup data to the data storage unit 32.

The data storage unit 32 stores backup data output from each off-line robot 35. The data storage unit 32 outputs a backup start signal to the time measurement unit 34 when backup of data of each off-line robot 35 is started. When the data backup of each off-line robot 35 has been completed, the data storage unit 32 outputs a backup completion signal to the evaluation unit 33.

Upon receiving the backup completion signal from the data storage unit 32, the evaluation unit 33 starts to install update-software and an evaluation program for evaluating the update-software in the off-line robot 35 to be updated.

The evaluation unit 33 installs, based on the information about the in-line robot 45 to be updated transmitted from the data analysis server 5, the update-software and the evaluation program in the corresponding off-line robot 35. When the installation of the update-software and the evaluation program has been completed, the evaluation unit 33 outputs an installation completion signal to the time measurement unit 34.

The evaluation unit 33 evaluates the update-software of the off-line robot 35 according to the evaluation program. The evaluation unit 33 evaluates the update-software of the off-line robot 35 according to the defined evaluation list and determines whether or not it is possible to update the in-line robot by the update-software. The evaluation unit 33 determines that the update-software is not updatable when, for example, there is a defect in the update-software such as when a time taken for the update is long.

The time measurement unit 34 measures an update time, i.e., a time until backup data of each off-line robot 35 is stored in the data storage unit 32 and the update-software is installed in each off-line robot 35. For example, the time measurement unit 34 starts to measure the update time upon receiving a backup start signal from the data storage unit 32 and stops the measurement of the update time upon receiving an installation completion signal from the evaluation unit 33. By doing so, the time measurement unit 34 measures the update time of the off-line robot 35.

The off-line management server 3 transmits the update time of the update-software and a result of the determination as to whether or not it is possible to update the in-line robot to the data analysis server 5. Upon receiving the result of the determination that the in-line robot cannot be updated by the update-software from the off-line management server 3, a data transmission/reception unit 51 of the data analysis server 5 transmits the determination result and the evaluation result to the manufacturer server 6.

Figure 5:
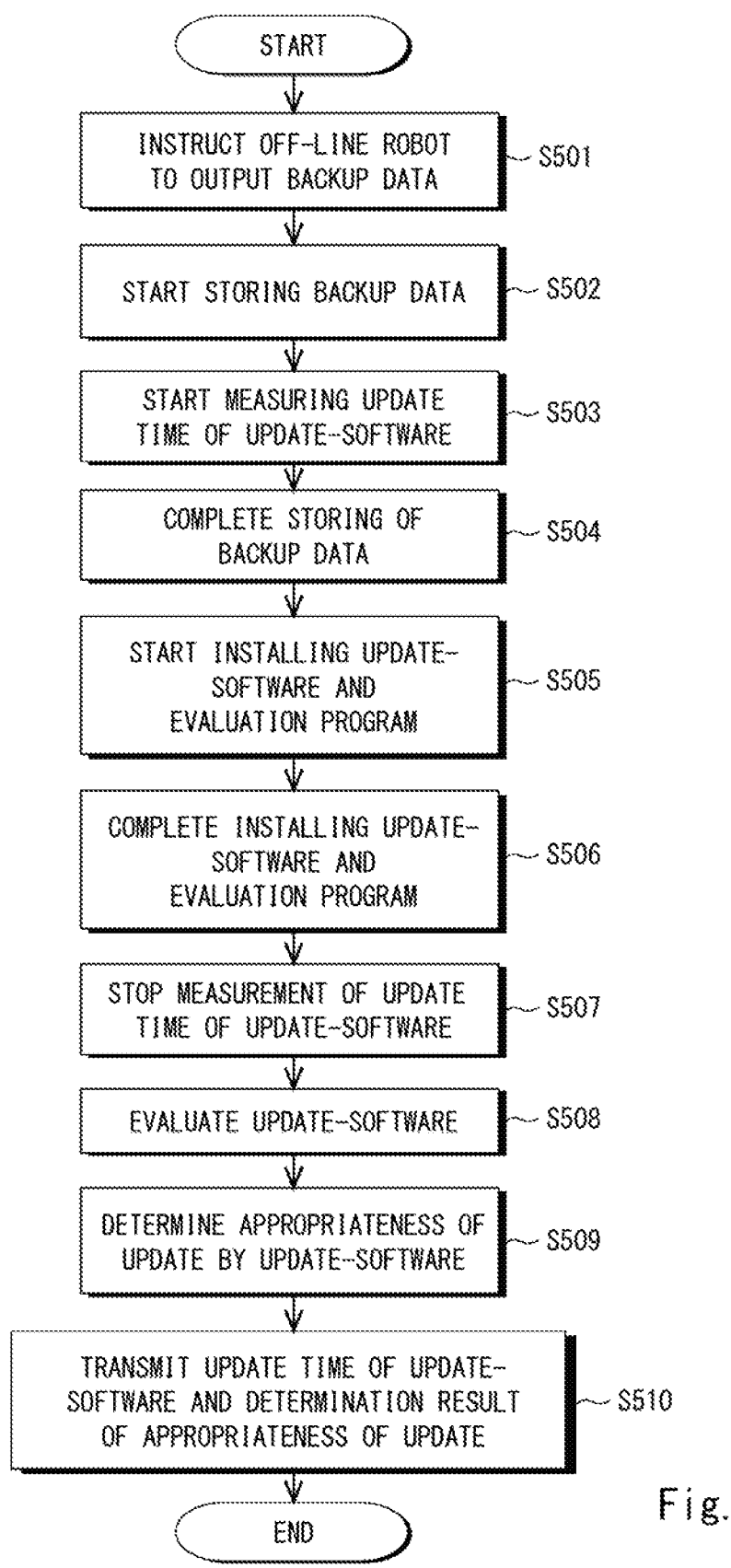
FIG. 5 is a flowchart showing a process flow of an off-line management server.

FIG. 5 is a flowchart showing a process flow of the off-line management server.

The software management unit 31 instructs, based on the information of the in-line robot 45 to be updated transmitted from the data analysis server 5, the corresponding off-line robot 35 to output backup data (step S501). The off-line robot 35 outputs the backup data to the data storage unit 32 in response to an output instruction signal from the software management unit 31.

The data storage unit 32 starts to store the backup data output from each off-line robots 35 (step S502).

The time measuring unit 34 receives a backup start signal from the data storing unit 32 and starts to measure the update time of the update-software (step S503).

When the storing (i.e., the saving) of the backup data of each off-line robot 35 has been completed, the data storage unit 32 outputs a backup completion signal to the evaluation unit 33 (step S504).

Upon receiving the backup completion signal from the data storage unit 32, the evaluation unit 33 starts to install the update-software and the evaluation program in the off-line robot 35 to be updated (step S505).

When the installation of the update-software and the evaluation program has been completed, the evaluation unit 34 outputs an installation completion signal to the time measurement unit 33 (step S506).

Upon receiving the installation completion signal from the evaluation unit 33, the time measurement unit 34 stops the measurement of the update time (step S507).

The evaluation unit 33 evaluates the update-software according to the evaluation program (step S508), and determines whether or not it is possible to update the in-line robot by the update-software (step S509).

The off-line management server 3 transmits the update time of the update-software and a result of the determination as to whether or not it is possible to update the in-line robot to the data analysis server 5 (step S510).

Next, the in-line management server 4 is described in detail.

A plurality of in-line robots 45 are connected to the in-line management server 4 through a network or the like. The in-line management server 4 manages the in-line robots 45. The in-line management server 4 includes a software management unit 41 that manages software of the in-line robots 45, a memory arrangement unit 42 that arranges memories of the in-line robots 45, a data storage unit 43 that stores backup data of the in-line robots 45, and a software update unit 44 that updates the software of the in-line robots 45.

The software management unit 41 starts to update the software of the in-line robot 45 to be updated at the timing of the update of the software of the in-line robot 45 to be updated transmitted from the data analysis server 5. The software management unit 41 instructs, based on the timing of the update of the software of the in-line robot 45 to be updated transmitted from the data analysis server 5, the in-line robot 45 to be updated to output backup data.

For example, upon receiving a stop signal indicating the stop of the robot from the in-line robot 45, the software management unit 41 instructs the in-line robot 45 to be updated to output backup data.

Note that a user may make a final decision as to whether or not it is possible to update the in-line robot of the software before the software management unit 41 instructs the in-line robot 45 to be updated to output backup data. In this way, it is possible to determine the start of the update of the software of the in-line robot 45 more reliably. For example, when the software management unit 41 receives an input for starting the updating process from a user through an input device such as a PC, it may instruct the in-line robot 45 to be updated to output backup data.

When the update of the software of the in-line robots 45 by the software update unit 44 has been completed, the software management unit 41 transmits memory space information of each in-line robot 45 and version information the software of each in-line robot 45 to the data analysis server 5.

The data storage unit 43 stores the backup data output from the in-line robot 45 to be updated. When the storing (i.e., the saving) of the backup data has been completed, the data storage unit 44 outputs a backup completion signal to the software update unit 43.

The memory arrangement unit 42 stores and manages memory capacities of the in-line robots 45 output from the in-line robots 45. The memory arrangement unit 42 determines, based on the software information transmitted from the data analysis server 5, whether or not the memory capacity of each in-line robot 45 to be updated is larger than a memory capacity required for the update-software (hereinafter referred to as a required memory capacity).

When the memory arrangement unit 42 determines that the memory capacity of each in-line robot 45 is smaller than the required memory capacity, it performs data reduction in each in-line robot 45 so that the memory capacity of that in-line robot 45 becomes larger than the required memory capacity.

Upon receiving the backup completion signal from the data storage unit 43, the software update unit 44 updates the software of the in-line robots 45 at the timing of the update of the software scheduled by the software update scheduling unit 52 of the data analysis server 5.

Figure 6:
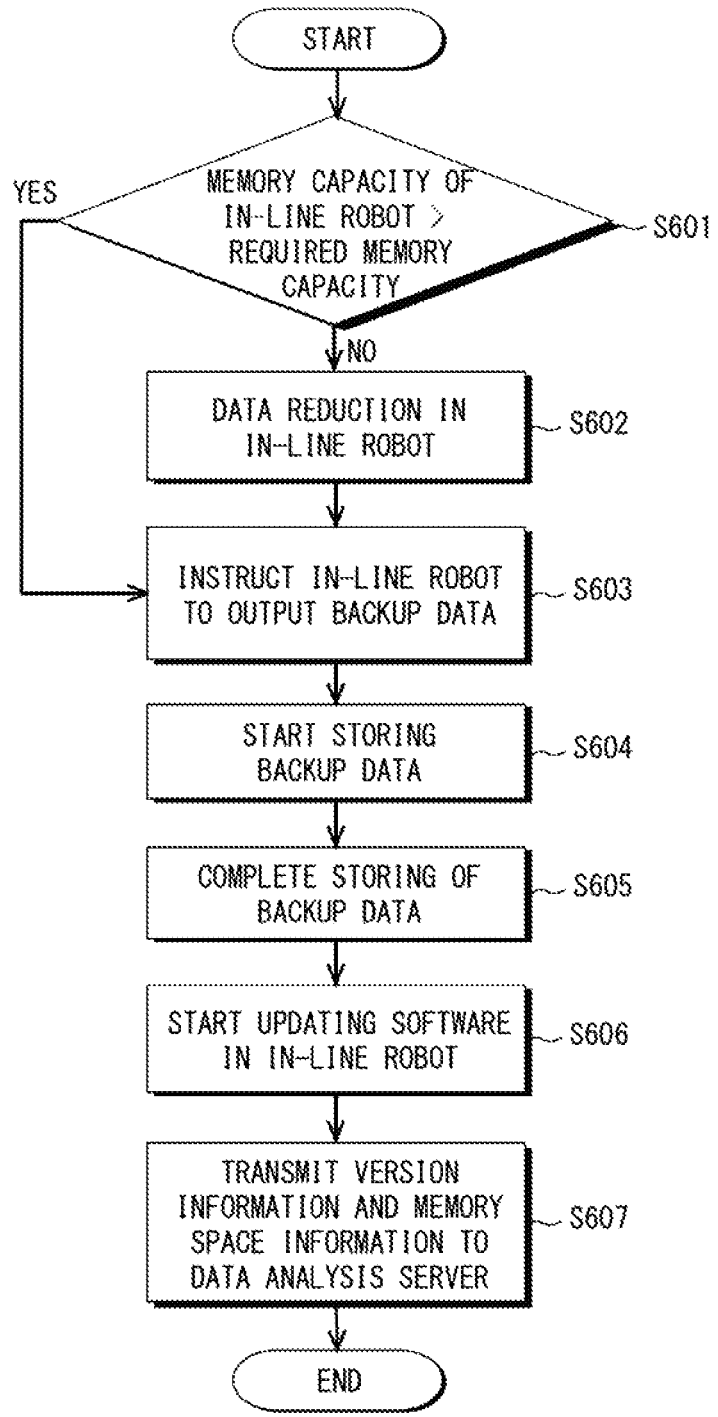
FIG. 6 is a flowchart showing a process flow of an in-line management server.

FIG. 6 is a flowchart showing a processing flow of the in-line management server.

The memory arrangement unit 42 determines whether or not the memory capacity of the in-line robot 45 to be updated is larger than the required memory capacity based on the software information transmitted from the data analysis server 5 (step S601).

When the memory arrangement unit 42 determines that the memory capacity of the in-line robot 45 is smaller than the required memory capacity (No at step S601), the memory arrangement unit 42 performs data reduction in the in-line robot 45 so that the memory capacity of the in-line robot 45 becomes larger than the required memory capacity (step S602).

The software management unit 41 instructs, based on the timing of the update of the software of the in-line robot 45 transmitted from the data analysis server 5, the in-line robot 45 to be updated to output backup data (step S603). The in-line robot 45 to be updated outputs backup data to the data storage unit 43 in response to an output instruction signal from the software management unit 41.

The data storage unit 43 starts to store the backup data of the in-line robot 45 to be updated (step S604). When the storing (i.e., the saving) of the backup data has been completed (step S605), the data storage unit 44 outputs a backup completion signal to the software update unit 43.

Upon receiving the backup completion signal from the data storage unit 43, the software update unit 44 starts to update the software of the in-line robots 45 (step S606).

When the update of the software of the in-line robots 45 by the software update unit 44 has been completed, the software management unit 41 transmits a memory space information of each in-line robot 45 and version information of the software of each in-line robot 45 to the data analysis server 5 (step S607).

Next, the data analysis server 5 is described in detail. The data analysis server 5 analyzes data.

The data analysis server 5 includes a data transmission/reception unit 51 that transmits/receives data to/from a manufacturer server 6, a software update scheduling unit 52 that makes a schedule for updating software, and a data storage unit 53 that stores data.

The data transmission/reception unit 51 receives information about software to be updated (hereinafter also referred to as software information) transmitted from the manufacturer server 6. The software information includes update-software, version information of the update-software, and information about a memory space required for the update-software (also referred to as memory space information).

When there is a defect in the update-software, the data transmission/reception unit 51 transmits information about the defect to the manufacturer server 6. The data transmission/reception unit 51 outputs the software information received from the manufacturer server 6 to the software update scheduling unit 52.

The software update scheduling unit 52 searches for the in-line robot 45 to be updated based on the software information output from the data transmission/reception unit 51. The software update scheduling unit 52 transmits information about the found in-line robot 45 to be updated to the off-line management server 3.

The software update scheduling unit 52 receives an idle-time list, a maintenance-time list, and information about a production plan of the in-line robot 45 from the production management server 2. The software update scheduling unit 52 receives an update time of the update-software and a result of the determination as to whether or not it is possible to update the in-line robot from the off-line management server 3.

The software update scheduling unit 52 schedules the timing of the update of the software of the in-line robot 45 based on the update time of the update-software and the result of the determination as to whether or not it is possible to update the in-line robot as well as the idle-time list, the maintenance-time list, and the information about the production plan of the in-line robot 45.

The software update scheduling unit 52 calculates a net (actual) idle time T3 (T3=T1−T2) in each non-operating time period by subtracting a maintenance time T2 in that non-operating time period recorded in the maintenance-time list from an idle time T1 in that non-operating time period recorded in the idle-time list.

The software update scheduling unit 52 creates a net-idle-time list indicating a length of a net idle time in each non-operating time period. Note that the time calculation unit 22 of the production management server 2 may create the net-idle-time list and transmit the created net-idle-time list to the software update scheduling unit 52 of the data analysis server 5.

For the update-software of the in-line robot 45 that has been determined to be updatable, the software update scheduling unit 52 schedules, based on the net-idle-time list, the timing of the update of the software of the in-line robot 45 so that a update time T4 of the update-software is contained in a net idle time T3 (T4<T3) in each non-operating time period.

For example, as shown in FIG. 7, the software update scheduling unit 52 calculates the net idle time in the non-operating time period A on Dec. 7, 2018, which is 120 minutes in this example, by subtracting the maintenance time in the non-operating time period A recorded in the maintenance-time list, which is 120 minutes, from the idle time in the non-operating time period A recorded in the idle-time list, which is 240 minutes.

For the update-software of the in-line robot 45 that has been determined to be updatable, the software update scheduling unit 52 schedules the timing of the update of the software of the in-line robot 45 so that the update time of the update-software is contained in (i.e., becomes shorter than) the net idle time of 120 minutes in the non-operating time period A. For example, the software update scheduling unit 52 makes a schedule so as to update the software of the in-line robot 45 which is supposed to take 50 minutes (40 minutes+10 minutes margin) in the non-operating time period A including the net idle time of 120 minutes.

Note that a user may schedule the timing of the update of the software of the in-line robot 45 by referring to the net-idle-time list created by the software update scheduling unit 52.

The software update scheduling unit 52 transmits the scheduled timing of the update of the software of the in-line robot 45 to the in-line management server 4.

The data storage unit 53 stores and manages information about the current memory space of each in-line robot 45 transmitted from the in-line management server 4 and information of the current version of the software of each in-line robot 45.

Figure 8:
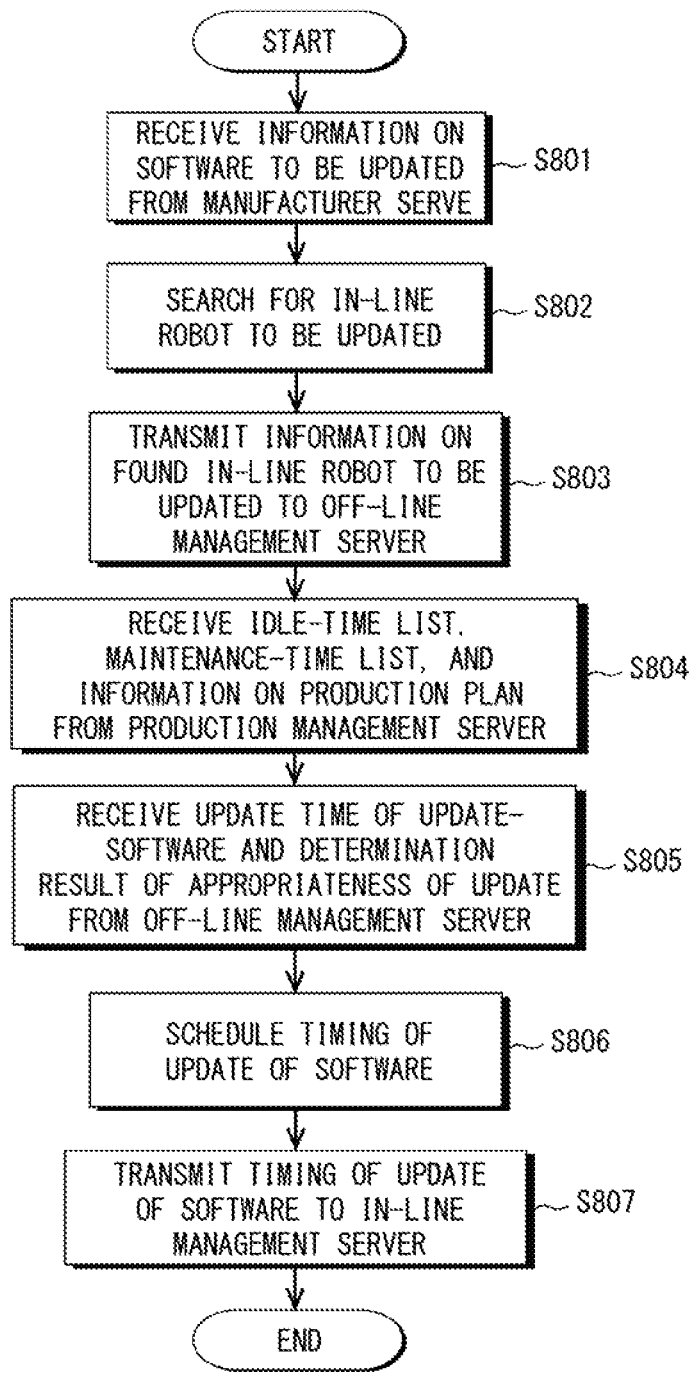
FIG. 8 is a flowchart showing a process flow of a data analysis server.

FIG. 8 is a flowchart showing a processing flow of the data analysis server.

The data transmission/reception unit 51 of the data analysis server 5 receives the information about the software to be updated (hereinafter also referred to as software information) transmitted from the manufacturer server 6 (step S801).

The software update scheduling unit 52 searches for the in-line robot 45 to be updated based on the software information output from the data transmission unit (step S802).

The software update scheduling unit 52 transmits information about the found in-line robot 45 to be updated to the off-line management server 3 (step S803).

The software update scheduling unit 52 receives an idle-time list, a maintenance-time list, and information about a production plan of the in-line robot 45 from the production management server 2 (step S804).

The software update scheduling unit 52 receives an update time of the update-software and a result of the determination as to whether or not it is possible to update the in-line robot from the off-line management server 3 (step S805).

The software update scheduling unit 52 schedules the timing of the update of the software of the in-line robot 45 to be updated based on the update time of the update-software and the result of the determination as to whether or not it is possible to update the in-line robot as well as the idle-time list, the maintenance-time list, and the information about the production plan of the in-line robot 45 (step S806).

The software update scheduling unit 52 transmits the timing of the update of the software of the in-line robot 45 to the in-line management server 4 (step S807).

As described above, in the automatic updating system 1 according to this embodiment, the off-line management server 3 installs update-software transmitted from the manufacturer server 6 in a corresponding off-line robot 35 based on the transmitted update-software, evaluates the installed update-software, and determines whether or not it is possible to update the in-line robot by the update-software based on the evaluation. The data analysis server 5 schedules a timing of the update of the software of the in-line robot 45 so that the update by the update-software, which has been determined to be updatable by the off-line management server 3, is carried out within a non-operating time of the in-line robot 45 calculated by the production management server 2. The in-line management server 4 updates the software of the in-line robot 45 at the timing scheduled by the data analysis server 5. As a result, it is possible to prevent defects in the update-software. That is, it is possible to reduce the number of steps for updating the software of the in-line robots 45 and prevent defects in the update-software.

Several embodiments according to the present disclosure have been explained above. However, these embodiments are shown as examples but are not shown to limit the scope of the disclosure. These novel embodiments can be implemented in various forms. Further, their components/structures may be omitted, replaced, or modified without departing from the scope and spirit of the disclosure. These embodiments and their modifications are included in the scope and the spirit of the disclosure, and included in the scope equivalent to the invention specified in the claims.

In the present disclosure, for example, the processes shown in FIGS. 4, 5, 6 and 8 can be implemented by causing a CPU to execute a computer program(s).

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.).

The program may be provided to a computer using any type of transitory computer readable media. Examples of transitory computer readable media include electric signals, optical signals, and electromagnetic waves. Transitory computer readable media can provide the program to a computer through a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An automatic updating system configured to automatically update software of an in-line robot disposed at a production line in a factory, comprising:
    an off-line management server configured to manage an off-line robot, the off-line robot being a robot that is not used in the production line;
    an in-line management server configured to manage the in-line robot;
    a production management server configured to calculate a non-operating time of the in-line robot in each time period based on a production plan of the factory; and
    a data analysis server configured to schedule a timing of an update of the software of the in-line robot, wherein
    the off-line management server installs update-software transmitted from a manufacturer server in a corresponding off-line robot based on the transmitted update-software, evaluates the installed update-software, and determines whether or not it is possible to update the in-line robot by the update-software based on the evaluation,
    the data analysis server schedules the timing of the update of the software of the in-line robot so that the update by the update-software, which has been determined to be updatable by the off-line management server, is carried out within the non-operating time of the in-line robot calculated by the production management server, and
    the in-line management server updates the software of the in-line robot at the timing scheduled by the data analysis server.

2. The automatic updating system according to claim 1, wherein
    the production management server creates an idle-time list indicating a length of the non-operating time of the in-line robot in each time period based on the production plan of the factory and creates a maintenance-time list indicating a length of a maintenance time of the in-line robot in each time period based on a maintenance plan of the factory, and
    the data analysis server creates a net-idle-time list indicating a length of a net idle time in each non-operating time period by subtracting the maintenance time in each non-operating time period in the maintenance-time list from the idle time in that non-operating time period in the idle-time list, and schedules the timing of the update of the software of the in-line robot so that the update by the update-software is carried out within the net idle time in the net-idle-time list.

3. The automatic updating system according to claim 1, wherein when the in-line management server determines that a memory capacity of an in-line robot to be updated is smaller than a memory capacity required for the update-software based on updated-software information transmitted from the manufacturer server, the in-line management server performs data reduction in that in-line robot so that the memory capacity of that in-line robot becomes larger than the required memory capacity.

4. An updating method by an automatic updating system, the automatic updating system comprising:
    an off-line management server configured to manage an off-line robot, the off-line robot being a robot that is not used in a production line in a factory;
    an in-line management server configured to manage an in-line robot disposed at the production line in the factory;
    a production management server configured to calculate a non-operating time of the in-line robot in each time period based on a production plan of the factory; and
    a data analysis server configured to schedule a timing of an update of the software of the in-line robot,
    the updating method comprising:
    installing, by the off-line management server, update-software transmitted from a manufacturer server in a corresponding off-line robot based on the transmitted update-software, evaluating the installed update-software, and determining whether or not it is possible to update the in-line robot by the update-software based on the evaluation;
    scheduling, by the data analysis server, the timing of the update of the software of the in-line robot so that the update by the update-software, which has been determined to be updatable by the off-line management server, is carried out within the non-operating time of the in-line robot calculated by the production management server; and
    updating, by the in-line management server, the software of the in-line robot at the timing scheduled by the data analysis server.

5. A non-transitory computer readable medium storing a program for an automatic updating system,
    the automatic updating system comprising:

an off-line management server configured to manage an off-line robot, the off-line robot being a robot that is not used in a production line in a factory;

an in-line management server configured to manage an in-line robot disposed at the production line in the factory;

a production management server configured to calculate a non-operating time of the in-line robot in each time period based on a production plan of the factory; and a data analysis server configured to schedule a timing of an update of the software of the in-line robot, the program being adapted to cause a computer to execute:

a process for installing, by the off-line management server, update-software transmitted from a manufacturer server in a corresponding off-line robot based on the transmitted update-software, evaluating the installed update-software, and determining whether or not it is possible to update the in-line robot by the update-software based on the evaluation;

a process for scheduling, by the data analysis server, the timing of the update of the software of the in-line robot so that the update by the update-software, which has been determined to be updatable by the off-line management server, is carried out within the non-operating time of the in-line robot calculated by the production management server; and a process for updating, by the in-line management server, the software of the in-line robot at the timing scheduled by the data analysis server.

* * * * *